United States Patent [19]

Mitchell et al.

[11] Patent Number: 5,651,852
[45] Date of Patent: Jul. 29, 1997

[54] METHOD FOR MAKING LINERLESS LABELS WITH A SPECIFIC TIE COAT

[75] Inventors: Nancy G. Mitchell, Grand Island; Joseph W. Langan, Cheektowaga; Adele C. Shipston, Williamsville; Timothy J. Russ, Niagara Falls; Douglas M. Smith, Buffalo, all of N.Y.

[73] Assignee: Moore Business Forms, Inc., Grand Island, N.Y.

[21] Appl. No.: 426,838

[22] Filed: Apr. 24, 1995

Related U.S. Application Data

[60] Division of Ser. No. 304,222, Sep. 12, 1994, Pat. No. 5,547,738, which is a continuation-in-part of Ser. No. 912,851, Jul. 13, 1992, Pat. No. 5,354,588.

[51] Int. Cl.$^6$ .............. B32B 31/00; B42D 15/00
[52] U.S. Cl. .............. 156/252; 156/257; 156/289; 283/81; 283/101
[58] Field of Search ............ 156/267, 269, 156/270, 268, 252, 271, 289, 259; 428/353, 40, 41, 42, 43, 914, 352; 283/81, 100, 101

[56] References Cited

U.S. PATENT DOCUMENTS

| | | | |
|---|---|---|---|
| 2,845,728 | 8/1958 | Huber | 428/913 |
| 3,051,588 | 8/1962 | Lavanchy | 428/352 |
| 3,282,727 | 11/1966 | Crone et al. | 117/68.5 |
| 3,285,771 | 11/1966 | Dabroski | 428/352 |
| 3,575,788 | 4/1971 | Funk | 161/167 |
| 3,855,052 | 12/1974 | Mestetsky | 161/167 |
| 4,056,661 | 11/1977 | Sato et al. | 428/144 |
| 4,098,935 | 7/1978 | Knudsen | 428/40 |
| 4,117,198 | 9/1978 | Power et al. | 428/452 |
| 4,135,023 | 1/1979 | Lloyd et al. | 428/167 |
| 4,241,142 | 12/1980 | Kaliski et al. | 428/511 |
| 4,578,302 | 3/1986 | Schmidt, Jr. et al. | 428/110 |
| 4,851,383 | 7/1989 | Fickenscher et al. | 503/200 |
| 4,882,211 | 11/1989 | McIntyre et al. | 428/40 |
| 4,927,689 | 5/1990 | Markiewicz | 428/34.8 |
| 4,948,663 | 8/1990 | Hürter et al. | 428/331 |
| 5,135,798 | 8/1992 | Muschter et al. | 428/202 |
| 5,183,696 | 2/1993 | Sanderson | 428/194 |
| 5,209,959 | 5/1993 | McNaul et al. | 428/40 |
| 5,354,588 | 10/1994 | Mitchell et al. | 428/40 |
| 5,356,706 | 10/1994 | Shores | 428/352 |
| 5,358,281 | 10/1994 | Greig | 283/81 |
| 5,518,762 | 5/1996 | Soltysiak | 427/208 |

FOREIGN PATENT DOCUMENTS

| | | |
|---|---|---|
| 1220764 | 4/1987 | Canada. |
| 1248412 | 1/1989 | Canada. |
| 2016889 | 5/1990 | Canada. |
| 0081963 | 6/1983 | European Pat. Off.. |
| 0096841 | 12/1983 | European Pat. Off.. |
| 0387916 | 9/1990 | European Pat. Off.. |
| 0475592 | 3/1992 | European Pat. Off.. |
| 2489352 | 3/1982 | France. |
| 554019 | 6/1943 | United Kingdom. |
| 2013613 | 1/1978 | United Kingdom. |

OTHER PUBLICATIONS

Adesives Age, Nov. 1983, "In–Line Converting UV Silicone and Hot Melt Combined For General Purpose Tapes and Labels", McIntyre, pp. 31–33.

Handbook of Pressure–Sensitive Adhesive Technology, Feb. 2, 1983, D. Satas, pp. 188–193; 216–221; 276–281; 300–305; 332–333; 370–379; 384–399; 404–411.

Derwent Publications, JP–A–60 233 181 (Abstract).
Derwent Publications, JP–A–3 273 079 (Abstract).

*Primary Examiner*—James Engel
*Assistant Examiner*—Linda L. Gray
*Attorney, Agent, or Firm*—Nixon & Vanderhye P.C.

[57] ABSTRACT

Linerless label stock is produced from a single substrate utilizing a coating machine by moving the substrate through the coating machine and applying a tie coating to the substrate first face, a release coating to the substrate second face, and a pressure sensitive adhesive to the tie coating. The tie coating comprises a dispersion of a pigment, such as silica, with a binder, such as polyvinyl alcohol. The substrate is cut to form individual labels, and is rolled up into a roll with the release coated second face on the outside of the roll. Printing may be applied to the substrate prior to coating, or to the release coating.

7 Claims, 2 Drawing Sheets

METHOD FOR MAKING LINERLESS LABELS WITH A SPECIFIC TIE COAT

CROSS-REFERENCE TO RELATED APPLICATION

This application is a divisional of U.S. application Ser. No. 08/304,222, filed Sep. 12, 1994 now U.S. Pat. No. 5,547,738, which is a continuation-in-part of application Ser. No. 07/912,851, filed Jul. 13, 1992, now U.S. Pat. No. 5,354,588.

FIELD OF THE INVENTION

This invention relates to linerless labels, and in particularly to linerless labels having pressure sensitive adhesive coatings.

BACKGROUND AND SUMMARY OF THE INVENTION

Linerless labels, such as shown in U.S. Pat. No. 3,051,588, 3,285,771, and 4,851,383, and in Canadian patent 1,248,412, are known to have advantages over conventional pressure sensitive labels which are mounted on a liner having a release coating. In conventional labels, the liner acts as a support for transport, printing and storage, and is discarded after the label is removed from the liner. In contrast, a linerless label has a face surface coated with a release coating and a back surface that is coated with a pressure sensitive adhesive (PSA). A strip of linerless labels may be wound in a roll configuration so that the PSA on the back side of the strip is in contact with the release coating on the face side of the strip, where the release coating faces outwardly. The adhesion between the PSA and release coating hold the strip in a roll. Labels can be peeled off individually from the roll of linerless labels, without having a liner web to tear off and discard each time a label is used.

Because a liner web is not needed in a roll of linerless labels, certain advantages and cost savings have been achieved including substantial material reduction due to the lack of a liner, elimination of the disposal liner and costs associated with release coated liners, and space savings in that approximately a roll of linerless labels can have about twice as many labels as a same size roll of liners with labels. Despite these advantages, linerless labels have not enjoyed had widespread commercial acceptance. The lack of acceptance is perhaps due in part to impediments to easy and clean peeling of the PSA from the release coating in the roll format. For example, if the adhesion between the PSA and the label substrate is weak or becomes weak (adhesion strength degrades over time under some environmental conditions and materials), then the PSA adhesive may stick to the release coating instead of the label as is intended, or the substrate may be torn when the labels are peeled off the label roll.

According to the present invention, a linerless label stock, and a method of making linerless labels, are provided which enhance the viability of linerless labels by providing a more secure adhesion of the PSA to the substrate than is typically provided in the prior art. According to the present invention a tie coat is provided which facilitates adherence of the PSA to a first face (the "back") of the substrate, the tie coat adhering to both the substrate first face and the PSA. The tie coat preferably comprises a dispersion of a pigment such as silica, with a binder, such as PVA. For example, the tie coat may consist essentially of about 30–40 parts silica dispersion, about 20–35 parts PVA, and about 30–40 water.

Printing may be provided on the substrate first face, or may be applied onto the release coating by certain printing techniques.

According to the method of making linerless labels of the invention, a coating machine is utilized with a substrate having first and second faces. The method comprises the steps of: (a) Continuously moving the substrate in a first direction through the coating machine, and substantially sequentially: (b) With the coating machine, applying in a predetermined sequence to the moving substrate a tie coating to the substrate first face, a release coating to the substrate second face, and a pressure sensitive adhesive to the tie coating. (c) Cutting the substrate to form individual labels. And, (d) rolling the substrate into a roll, with the release coated second face on the outside of the roll. In the practice of the method set forth above, the predetermined sequence of step (b) is preferably to apply the tie coating first, then the release coating, and then the pressure sensitive adhesive. The cutting step may be die cutting, and drying at a rate much faster than ambient air drying may be practiced before steps (c) and (d), by hot air, infrared, or like drying technique.

It is the primary object of the present invention to provide an advantageous linerless label stock, and a simple yet effective method for making the stock. This and other objects of the invention will become clear from an inspection of the detailed description of the invention and from the appended claims.

DETAILED DESCRIPTION OF THE DRAWINGS

Figure 1:
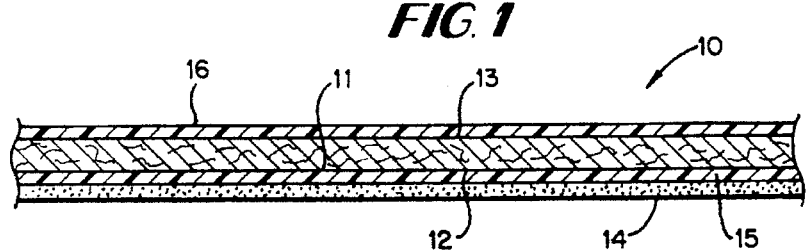
FIG. 1 is a cross-sectional view of exemplary linerless label stock according to the present invention showing each of the layers (with greatly exaggerated thickness)

An exemplary section of linerless label stock is shown generally by reference numeral 10 in FIG. 1. The stock 10 according to the invention comprises a substrate 11 having a first face 12 and a second face 13. The substrate may be any conventional substrate used in label applications, such as bond paper, latex-impregnated paper, vinyl, or polyester. The substrate is not a thermally-sensitive one.

Associated with the substrate 11 is a coating of pressure sensitive adhesive (PSA) 14. The pSA may comprise any conventional formulation used in pressure sensitive adhesive applications, including solvent-base, water-base, hot melt or radiation curable formulations. Typical adhesive formulations are listed in the "Handbook of pressure-Sensitive Technology" by Donalas Satas, Van Nostrand Reinhold Company, 1983. Particularly desirable PSA comprises a water-based acrylic adhesive prepared by free radical polymerization of acrylic monomers (either a homopolymer or a copolymer). For example the polymer may be made 70–100% of a soft monomer such as 2-ethylhexyl acrylate, 0–6% of functional monomer such as acrylic acid, and 0 to 30% of a hard monomer such a vinyl acetate which has repositional properties, but other properties found in removable or permanent adhesives may also be used. In addition, the PSA may be patterned to provide areas of the substrate, such as edges, that are free of adhesive to ease removal of the label from the roll or a surface, or to provide areas of relative adhesive weakness.

According to the invention, adherence of the PSA 14 to the substrate 11 first face 12 is provided by a tie coating 15. The tie coating 15 adheres to both the PSA and the substrate 11. It may comprise, or consist essentially of, a dispersion of a pigment, preferably silica, with a binder material, such as polyvinyl alcohol (PVA). For example the tie coating may comprise or consist essentially of about 30–40 parts silica dispersion, about 20–35 parts PVA, and 30–40 parts water.

On the second face 13 of the substrate 11, which may have printing thereon (see FIG. 4), a release coat 16 is provided. The release coating 16 is of any suitable material that imparts a lower surface energy to the face 13, and has properties with respect to the pSA 14 so that it will release easily from the PSA 14. The PSA 14 will not stick to the release coating 16, because it has a greater affinity for the underlying tie coating 15. Typical release coatings are listed in chapters 17 and 18 of the Handbook of Pressure-Sensitive Adhesive Technology by Satas, referenced above. Preferred formulations include silicone resins and chrome complexes of fatty acids.

Figure 2:
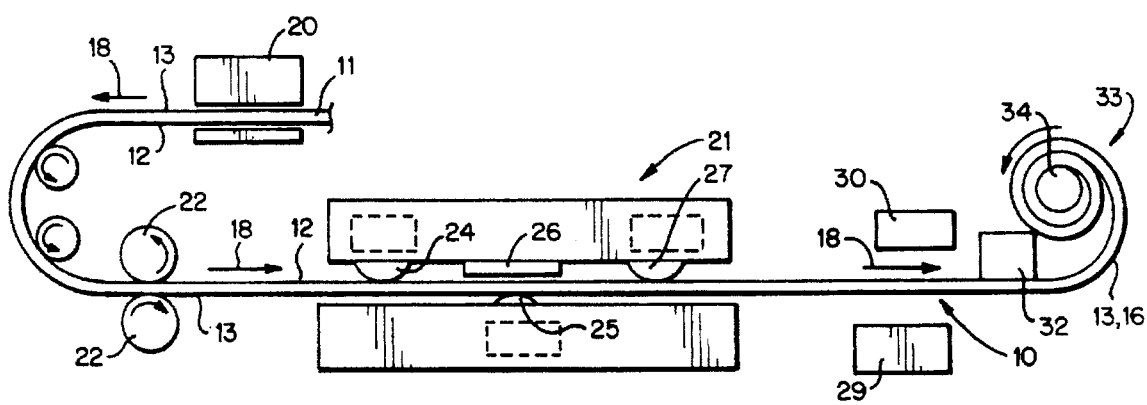
FIGS. 2 and 3 are side schematic views showing exemplary apparatuses for practicing an exemplary method of producing linerless labels according to the present invention.

FIG. 2 illustrates an exemplary apparatus for producing linerless labels according to an exemplary method of the present invention. The substrate 11 is continuously moved in the direction of arrows 18 printing may be applied to the second face 13, as with the conventional printer 20, which may be located prior to a coating machine 21, and drives for the substrate 11 may be any conventional driving means, such as drive rollers 22. Alternatively, the printer 20 may be located after a dryer 26 but before the second applicator 27, described below.

In the single, conventional coating machine 21, all three of the coatings 14–16 are provided. For example a first roller or like applicator 24 applies the tie coating 15 to the first face 12, while shortly thereafter a second roller or applicator 25 applies the release coating 16 to the second face 13. A dryer 26, for effecting drying of the tie coating 15 much more quickly than by ambient air (e.g. a hot air dryer) so that the tie coat is dry by the time it reaches the third roller or other applicator 27, which applies the pressure sensitive adhesive 14 over the tie coat 15, on the face 12, is also provided.

Drying of the PSA 14 and/or the release coat 16 may be provided by dryers 29, 30 downstream of the coating machine 21 in the direction of arrows 18, and after drying by the dryers 29, 30 (which effect drying much quicker than ambient air, and may be hot air, infrared, or like conventional dryers depending upon the particular coatings); and after the stock 10 is dried, it is cut into labels by a conventional cutter 32. Then the stock is taken up in roll format 33 by take up mechanism 34, with the release coating 16 and second face 13 on the outside of the roll 33 that is being taken up, with the PSA 14 in contact with the release coating 16 in the spiral configuration of the roll 33. The labels can be formed from a web which, just prior to take up 34, is slit into the rolls 33, or the rolls 33 can be formed later, after take up.

Figure 3:
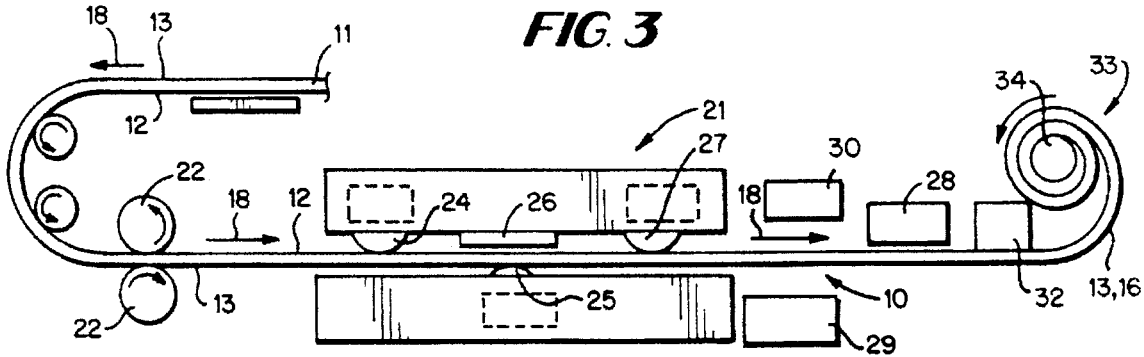

Alternatively, a non-impact printer 28 may be located after the coating machine 21, as is shown in FIG. 3. By locating the printer as shown in FIG. 3, the printer prints its image on top of the release coating or the adhesive coating. While an impact printer may be used to print an image directly on the substrate, as is shown in FIG. 2, it is suggested that a non-impact printer, e.g., an ink-jet, ion deposition or laser printers such as made by Midax®, Xeikon®, and Indigo®, be used to print an image, i.e., the black and white or color, on the substrate coatings. Moreover, the printer 28 can be in-line with the coating machine so that the coating and printing steps can be accomplished in the same manufacturing line. With respect to images printed after the coating machine, the printer should have release coated surfaces juxtaposed to the label stock to prevent adhesion between the PSA of the label stock and the printer. Printing can also be performed (not shown) on the release coat 16 (e.g. a hot melt ink, ink jet printer).

Figure 4:
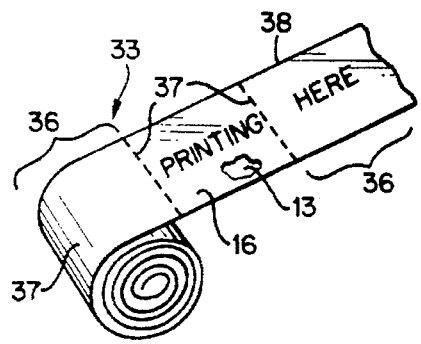
FIGS. 4 to 6 are perspective views of exemplary rolls of linerless label stock of FIG. 1, produced utilizing the apparatuses shown in FIGS. 2 and 3.
Figure 5:
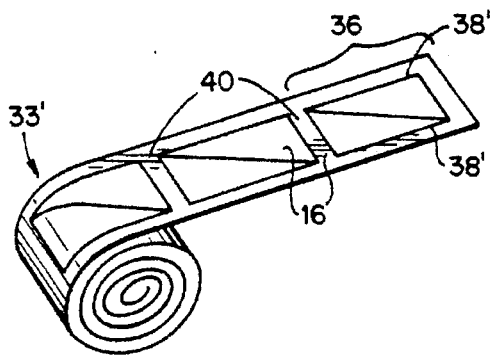
Figure 6:
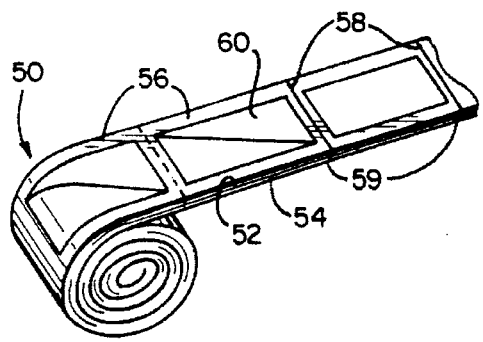

FIGS. 4, 5 and 6 illustrate two different constructions of rolls of linerless label. The roll 33 of FIG. 4 has individual labels 36 which have been cut, with less than complete severing (e.g. by very free perforations, or die cuts, indicated by cut lines 37 in FIG. 4), generally transverse to the direction of elongation of the substrate 11 of the roll 33, with the sides 38 of each label corresponding to the sides of the substrate 11. Each label 36 has a width and length typically less than one foot. In this construction there is no waste whatsoever but rather each label 36 is merely detached along a line 37 from the next quadrate label 36 in sequence.

FIG. 5 illustrates a modified form of a roll 33' of linerless labels according to the invention. In this embodiment, the cutter 32 effects complete die cutting of individual labels 36 out of the substrate, so that the edges 38' thereof do not correspond to the side edges of the substrate. The labels 36' may have any shape (they need not be quadrate), but in this embodiment there is some waste material provided by the skeletal structure 40 of the substrate outside of the labels 36'.

Figure 7:
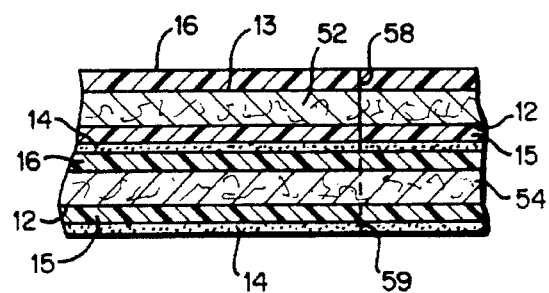
FIG. 7 is a cross-sectional view of the linerless label stock shown in FIG. 6.

FIG. 6 illustrates a further modified form of a roll 50 of linerless labels according to the invention. In this embodiment, the roll 50 is formed of two substrate webs 52, 54 of linerless labels that are piggy-backed together to provide a roll of two-substrate labels 56. These labels may be separated by a die cut 58 or perforated by the cutter 32. Alternatively, one of the substrates may be die cut 58 and the other substrate perforated 59. Similarly, a sub-label 60 can be die cut from a portion of one of the substrates for each label. As is shown in FIG. 7, the two-substrate label may be formed of a the first substrate 52 coated on a first (back) face 12 with a tie coating 15 which is in turn coated with a PSA 14, and a second (front) face 13 coated with a release coating 16. Similarly, the second substrate 54 is coated on a first (back) face 12 with a tie coating 15 which is in turn coated with a PSA 14, and a second face 13 coated with a release coating 16. The PSA of the first substrate adheres to the release coating of the second substrate to hold the two substrates together as a single label. The user can peel one substrate label from the other substrate label to have a coupon or routing slip having more than one parts.

The invention having been described in general terms, one specific example of a linerless label producible according to the invention is as follows:

EXAMPLE 1

A tie coat 15 was prepared according to the following formulation:

36 parts—20% Cab-O-Sperse II dispersion, Cabot Corp.
28 parts—10% Polyvinyl Alcohol, Air products & Chemicals (Partially Hydrolyzed)
36 parts—Water PSA 14 was prepared according to the following formulation:

51.2 parts—2% PVA 523, Air Products & Chemicals 48.7 parts—2-ethylhexyl acrylate (monomer) BASF
0.002 parts—Benzoyl Peroxide (BPO), Lucidol division of Pennwalt A release coating 16 was prepared according to the following formulation:

15 parts—Quilon C, Valcon
85 parts—Water

The tie coat 15 was applied to first face 12 with the applicator 24, the release coat 16 was applied to face 13 with the applicator 25, the tie coat was dried by the dryer 26, the PSA was applied over the tie coat 15 with the applicator 27, and the entire stock 10 was dried by dryers 29, 30, and after cutting into labels 32 was self-wound in roll form 33 by winder 34.

EXAMPLE 2

A tie coat 15 was prepared according to the following formulation:

50% Ethylene vinyl acetate
50% water

A pressure sensitive adhesive (PSA) was selected from the group comprising:

acrylic based adhesives, hot melt adhesives, both of which are available from National Starch and Chemical.

A release coating 16 was prepared according to the following formulation:

100% UV curable silicone, available from General Electric (UV 9300).

The invention has been described in connection with a embodiment of a linerless label stock and method of production thereof that provides a simple yet effective way provide to use labels, with no or little waste. While the invention has been described in what is presently conceived to be the most practical and preferred embodiment, it will be apparent to those of ordinary skill in the art that many modifications may be made thereof within the scope of the invention. The scope of the invention is to be accorded the broadest interpretation of the appended claims to encompass all equivalent products and processes.

We claim:

1. A method of making linerless labels using a coating machine, and a substrate having first and second faces, comprising the steps of:
   (a) continuously moving the substrate in a first direction through the coating machine;
   (b) with the coating machine, applying in a predetermined sequence to the moving substrate a tie coating coat consistently essentially of about 30–40 parts silica dispersion, about 20–35 parts polyvinyl alcohol, and about 30–40 parts water to the substrate first face, and further applying a release coating to the substrate second face, and a pressure sensitive adhesive to the tie coating;
   (c) cutting the substrate to form individual labels; and
   (d) rolling the substrate into a roll, with the release coated second face facing to an outside of the roll.

2. A method as recited in claim 1 wherein the predetermined sequence of step (b) is to apply the tie coating first, then the release coating, and then the pressure sensitive adhesive.

3. A method as recited in claim 1 comprising the further step of printing the second face of substrate prior to step (b).

4. A method as recited in claim 1 wherein step (c) is practiced by die cutting.

5. A method as recited in claim 1 comprising the further step of effecting drying of the coatings applied in step (b) by applying heat from a dryer, and prior to step (c).

6. A method of making linerless labels using a coating machine, and a substrate having first and second faces, comprising the steps of:
   (a) continuously moving the substrate in a first direction through the coating machine;
   (b) with the coating machine, applying in a predetermined sequence to the moving substrate a tie coat to the substrate first face, wherein said tie coat consists essentially of about 30–40 parts silica dispersion, about 20–35 parts polyvinyl alcohol, and about 30–40 parts water, and further applying a release coating to the substrate second face, and a pressure sensitive adhesive to the tie coating;
   (c) cutting the substrate to form individual labels; and
   (d) rolling the substrate into a roll, with the release coated second facing to an outside of the roll.

7. A method of making linerless labels using a coating machine, and a substrate having first and second faces, comprising the steps of:
   (a) continuously moving the substrate in a first direction through the coating machine, and sequentially;
   (b) with the coating machine, applying in a predetermined sequence to the moving substrate a tie coat consistently essentially of about 30–40 parts silica dispersion, about 20–35 parts polyvinyl alcohol, and about 30–40 parts water, to the substrate first face, a release coating to the substrate second face, and a pressure sensitive adhesive to the tie coating;
   (c) cutting the substrate to form individual labels; and
   (d) rolling the substrate into a roll, with the release coated second facing to outside of the roll.

* * * * *